US005899009A

United States Patent [19]

Fisher

[11] Patent Number: 5,899,009

[45] Date of Patent: May 4, 1999

[54] MARKER

[75] Inventor: Bradley Fisher, Zichron Yaakov, Israel

[73] Assignee: Scopus Light (1990) Ltd., Hof Hacarmel, Israel

[21] Appl. No.: 08/918,590

[22] Filed: Aug. 19, 1997

[30] Foreign Application Priority Data

Jun. 30, 1997 [IL] Israel ........................................ 121200

[51] Int. Cl.[6] ................................ B32B 3/08; G08B 7/00

[52] U.S. Cl. ................................................ 40/542; 40/570

[58] Field of Search .............................. 40/542, 545, 547, 40/555, 570; 362/34, 84; 250/462.1

[56] References Cited

U.S. PATENT DOCUMENTS

| | | | |
|---|---|---|---|
| 3,262,224 | 7/1966 | Hardesty . | |
| 3,478,209 | 11/1969 | Feuer | 250/462.1 |
| 3,578,973 | 5/1971 | Dooley et al. | 40/547 X |
| 3,724,202 | 4/1973 | Feller . | |
| 4,016,450 | 4/1977 | Balekjian | 250/462.1 X |
| 4,383,382 | 5/1983 | Hegarty | 40/545 |
| 4,677,008 | 6/1987 | Webb | 40/542 X |
| 4,889,660 | 12/1989 | Jensen et al. | 250/462.1 X |
| 4,928,414 | 5/1990 | Bright | 40/545 X |
| 5,165,781 | 11/1992 | Orak | 40/555 X |
| 5,323,492 | 6/1994 | DeMars | 362/34 X |

*Primary Examiner*—Joanne Silbermann
*Attorney, Agent, or Firm*—Ladas & Parry

[57] ABSTRACT

A marker suitable for use under conditions of sudden darkness comprising at least one phosphorescent indicium which provides a relatively high level of illumination for a relatively short period of time following exposure to light, sufficient to permit a person's eyes to adjust to darkness and at least one tritium illuminated indicium providing a relatively low level of illumination for a relatively long duration, which level of illumination is sufficient so as to be seen by a person once the person's eyes have adjusted to darkness.

6 Claims, 3 Drawing Sheets

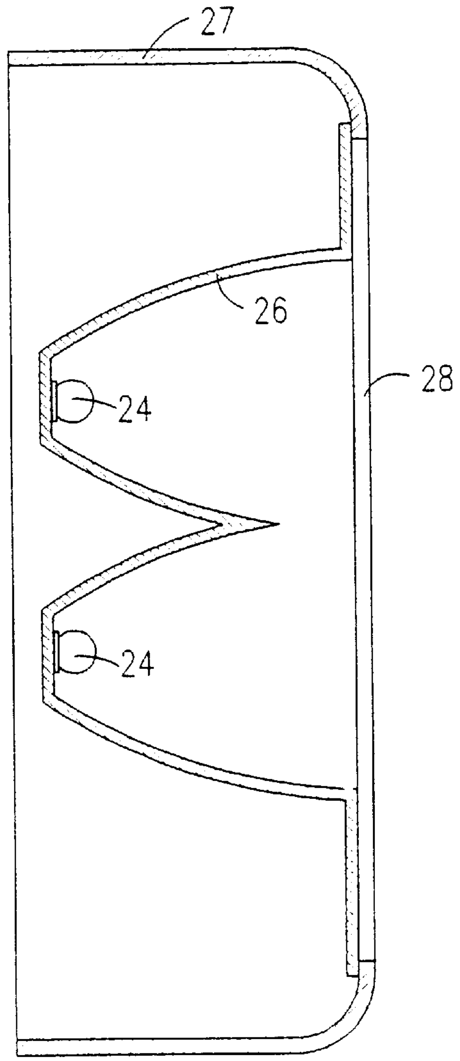
FIG. 3
FIG. 4A
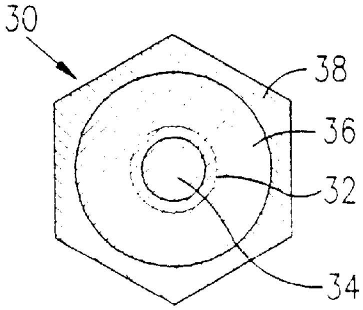
FIG. 4B
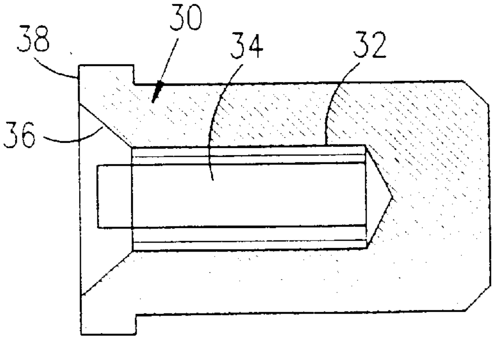

BRIGHTNESS (FT.LAMBERT)
3.0
2.5
2.0
1.5
1.0
0.5
0
TOP GRADE LUMINOVA
COMBINING LUMINOVA AND TRITIUM LIGHTING YIELDS OUTPUT WHICH STAYS USEFUL (AROUND .3 FT. LAMBERT)
TYPICAL TRITIUM LIGHT OUTPUT
1 2 3 4 5
10
15
20
25
200
400
600
ELAPSED TIME (MINUTES)

MARKER

FIELD OF THE INVENTION

The present invention relates to illuminated signs and markers generally.

BACKGROUND OF THE INVENTION

Various types of illuminated signs and markers are known, inter alia for use in emergency situations. Such markers include exit signs, directional markings leading to exits and markers indicating critical items or locations. Emergency electrical lighting, such as battery powered lighting, has been used for this purpose, as have tritium illuminated markers, although they provide a much lower light level. Phosphorescent markers are also known, although many of the applications thereof are in novelty items.

Electrically illuminated markings have the advantage that they shine brightly when power is available. They have the following disadvantages: They require wiring, bulbs and batteries for emergency operation. Installation is relatively expensive and continual maintenance and monitoring is required. Electrically illuminated markings are not readily retrofitted in existing installations and equipment.

Tritium illuminated devices have the advantage that they provide constant, no-maintenance, generally uniform level of illumination. They have disadvantages in that they provide a relatively low level of light, so low that they may not be readily seen during the first moments when a person is plunged into darkness and the person's eyes have not yet become adapted to the darkness.

Phosphorescent devices have the advantage that they can be conveniently located and require no power source, other than exposure to light. They provide a relatively high level of illumination immediately following exposure to light. They have the disadvantage that the level of illumination falls off very quickly, such that they become totally useless within 5–20 minutes after exposure to light, depending on the materials employed.

SUMMARY OF THE INVENTION

The present invention seeks to provide an improved marker which combines the well known advantages of prior art markers without their disadvantages.

There is thus provided in accordance with a preferred embodiment of the present invention a marker suitable for use under conditions of sudden darkness comprising at least one phosphorescent indicium which provides a relatively high level of illumination for a relatively short period of time following exposure to light, sufficient to permit a person's eyes to adjust to darkness and at least one tritium illuminated indicium providing a relatively low level of illumination for a relatively long duration, which level of illumination is sufficient so as to be seen by a person once the person's eyes have adjusted to darkness.

In accordance with one preferred embodiment of the invention the marker is a sign.

In accordance with one embodiment of the present invention, both the phosphorescent indicium and the tritium illuminated indicium have the same general shape.

Alternatively, the phosphorescent indicium and the tritium illuminated indicium may have different shapes.

BRIEF DESCRIPTION OF THE DRAWINGS

The present invention will be understood and appreciated more fully from the following detailed description, taken in conjunction with the drawings in which:

FIG. 3 is a simplified sectional illustration of the construction of the exit sign of FIG. 1 in accordance with an alternative embodiment of the present invention;

FIGS. 4A and 4B are simplified illustrations of a screw-in marker device which is constructed and operative in accordance with a preferred embodiment of the present invention.

DETAILED DESCRIPTION OF PREFERRED EMBODIMENTS

Figure 1:
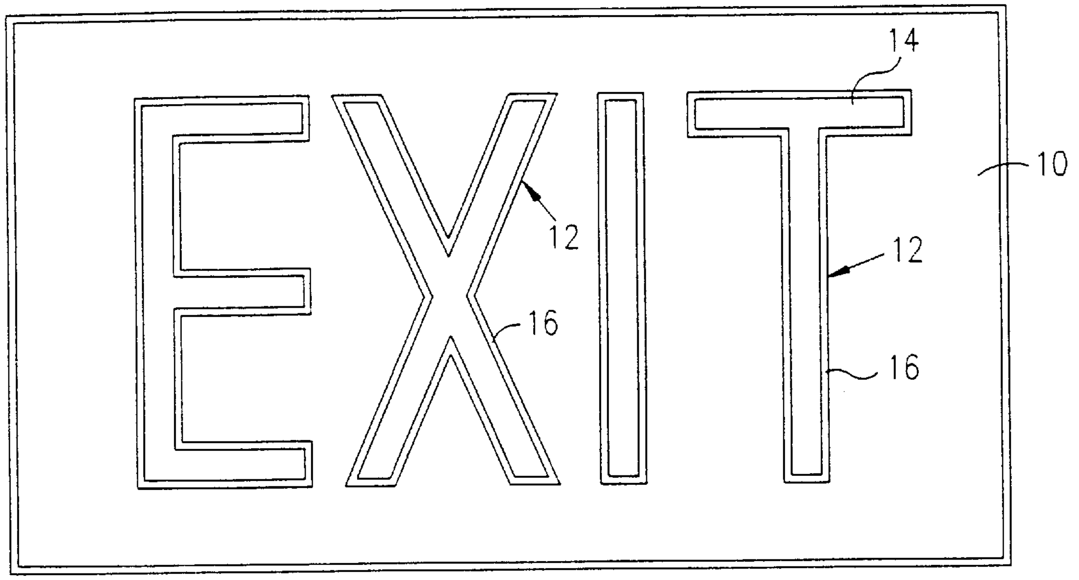
FIG. 1 is a simplified illustration of an exit sign constructed and operative in accordance with a preferred embodiment of the present invention.

Reference is now made to FIG. 1, which is a simplified illustration of an exit sign constructed and operative in accordance with a preferred embodiment of the present invention. The exit sign preferably comprises a face plate 10 onto which are formed letters 12 spelling the word EXIT.

In accordance with a preferred embodiment of the present invention, each of the letters 12 is formed of a solid portion 14, which is tritium illuminated. The tritium illuminated solid portion provides generally constant, no maintenance, long term illumination typically around 0.3–0.5 foot lamberts. Surrounding each solid portion 14 is an outline 16 of the letter 12, preferably formed of a phosphorescent material, which provides short term, quick drop off illumination typically at 3–10 foot lamberts.

Figure 2:
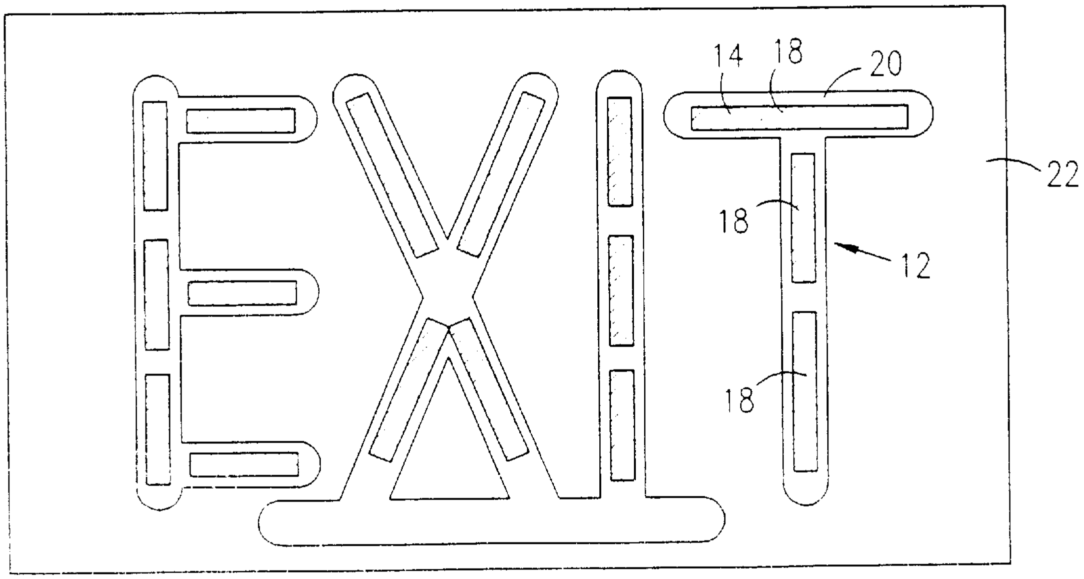
FIG. 2 is a simplified illustration of part of the construction of the exit sign of FIG. 1 in accordance with one embodiment of the present invention.

As seen in FIG. 2, the tritium illuminated solid portion 14 preferably is constructed of a plurality of tritium light sources 18 mounted in recesses 20 formed, as by vacuum forming, in a reflective panel 22. A generally translucent front panel, (not shown) which is opaque other than in the region of the recesses 20, is provided over the assembly of FIG. 2 to constitute the face plate 10 of the exit sign of FIG. 1. The phosphorescent material 16 is provided onto the front panel.

According to an alternative embodiment of the present invention, illustrated in FIG. 3, tritium light sources 24 are provided at the focus of generally parabolic reflectors 26 formed, as by vacuum forming, in a reflective base member 27. A patterned generally translucent front panel 28 is mounted thereof As distinguished from the embodiment of FIG. 2, here the tritium light sources 24 and the reflectors 26 are not located in any given pattern corresponding to the lettering of the sign, but rather provide general backlighting illumination to the suitably patterned front panel 28.

A preferred phosphorescent material is LUMINOVA, a Registered Trademark of Nemoto & Co. Ltd. of Tokyo, Japan. Other phosphorescent materials, based on ZnS:Cu may alternatively be employed. One such material is GSS, also sold by Nemoto & Co.

The phosphorescent material is available in the form of a powder, as a pigment, which is mixed into an ink or paint. In such a case it can be applied adjacent the tritium illuminated portion by painting or silk screening, for example. The phosphorescent material can also be combined with acrylic, polyester, epoxy, polypropylene, polyethylene and PVC polymers. Alternatively, it is available commercially in flexible PVC sheets, one example of which is LUMI SHEET available from Nemoto & Co, which can be cut into a desired shape and glued onto a given location.

Reference is now made to FIGS. 4A and 4B, which are simplified illustrations of a screw-in marker device which is constructed and operative in accordance with a preferred embodiment of the present invention. The device of FIGS. 4A and 4B includes a preferably threaded base portion 30 having formed therein an axial bore 32 in which is disposed a tritium light source 34. An inclined generally forward facing surface 36 is painted with reflective paint so as to be illuminated by the tritium light source 34. In accordance with a preferred embodiment of the present invention, a peripheral forward facing surface 38 is provided with a phosphorescent material so as to provide phosphorescent illumination.

Figure 5:
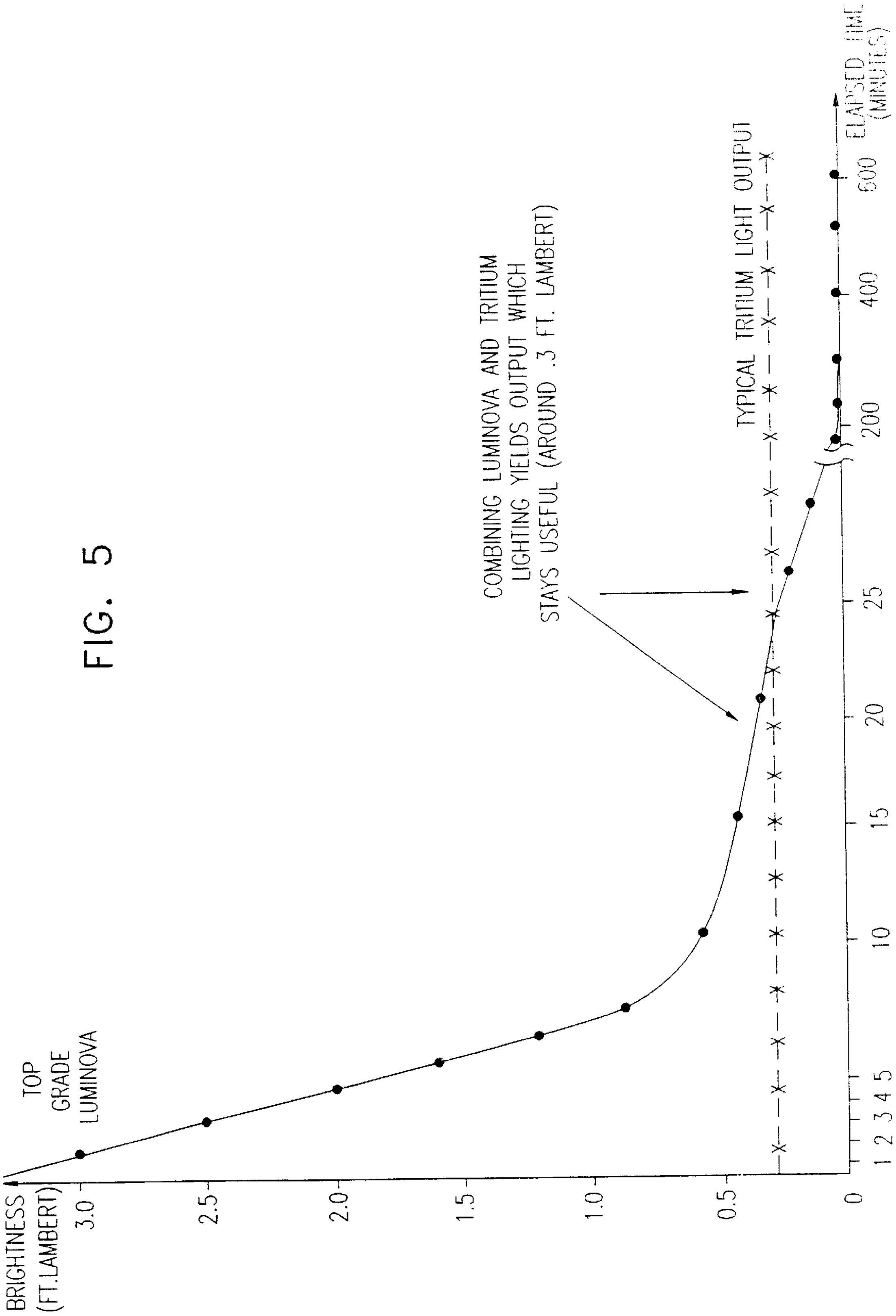
FIG. 5 is a graph illustrating typical relative illumination levels of tritium and phosphorescent light as a function of time following exposure to light.

It is a particular feature of the present invention that the present invention provides a solution, hitherto unavailable to the problem of emergency marking and signage under sudden conditions of darkness. As seen in FIG. 5, during an initial period, when persons eyes have not yet accommodated to the darkness, the phosphorescent material provides a relatively high level of illumination, which degrades rapidly from more than 3 foot lamberts to 0.3 foot lamberts over a duration of up to 25 minutes from the last exposure to ambient light. Thereafter, at such time as a person's eyes have been accustomed to the darkness, the tritium illuminated portions of the signs and markers provide generally constant illumination at a level of about 0.3 foot lamberts, which is sufficient. The transition between the phosphorescent illumination and the tritium illumination is gradual and concomitant with the adaptation of a person's eyes to darkness.

It will be appreciated by persons skilled in the art that the present invention is not limited by what has been particularly shown and described hereinabove. Rather the scope of the present invention includes both combinations and subcombinations of features described hereinabove as well as modifications, variations and extensions thereof which would occur to a persons skilled in the art upon reading the foregoing description, and which are not in the prior art.

What is claimed is:

1. A marker suitable for use under conditions of sudden darkness comprising:

at least one tritium illuminated indicium providing a relatively low level of illumination for a relatively long duration, which level of illumination is sufficient so as to be seen by a person once the person's eyes have adjusted to darkness;

at least one phosphorescent indicium seperate from said at least one tritium illuminated indicium which is illuminated by ambient light and not principally by illumination from said at least one tritium illuminated indicium and which provides a relatively high level of illumination for a relatively short period of time following exposure to said ambient light, sufficient to permit a person's eyes to adjust to darkness.

2. A marker according to claim 1 and wherein the marker is a sign.

3. A marker according to claim 2 and wherein the sign is a generally planar sign.

4. A marker according to claim 1 and wherein both the phosphorescent indicium and the tritium illuminated indicium have the same general shape.

5. A marker according to claim 1 and wherein both the phosphorescent indicium and the tritium illuminated indicium do not have the same general shape.

6. A marker according to claim 1 and wherein the marker comprises a threaded base having a bore in which said at least one tritium illuminated indicium is located.

* * * * *